Jan. 19, 1932. R. J. KEHL 1,841,446
ACETYLENE GENERATOR
Filed March 24, 1924
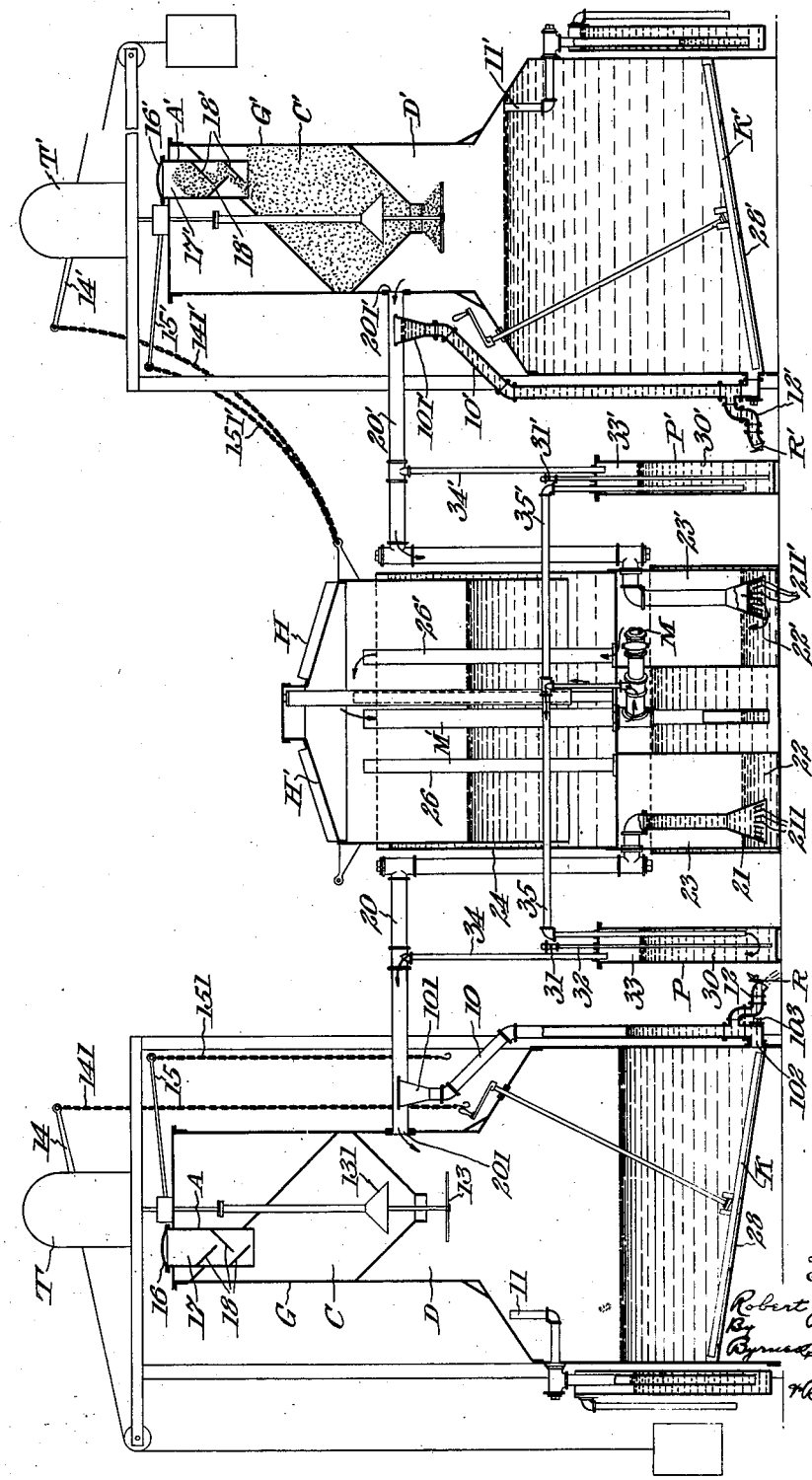

Patented Jan. 19, 1932

1,841,446

UNITED STATES PATENT OFFICE

ROBERT J. KEHL, OF NEWARK, NEW JERSEY, ASSIGNOR TO OXWELD ACETYLENE COMPANY, INC., A CORPORATION OF WEST VIRGINIA

ACETYLENE GENERATOR

Application filed March 24, 1924. Serial No. 701,505.

This invention relates to acetylene generators and particularly to acetylene generating apparatus especially adapted for use with oxy-acetylene welding and cutting equipment, as well as heating and lighting appliances requiring a continuous uniform supply of acetylene.

A satisfactory generating apparatus for such purposes must be arranged to continuously deliver substantially pure acetylene at practically uniform pressure. After the gas generating apparatus has been initially charged and purged of air, substantially pure acetylene will be delivered therefrom unless air leaks into the apparatus through a defective joint or seal, and unless air is admitted during recharging, as when the residuum is drawn off and the generator is recharged with calcium carbide and water.

Accordingly, the primary object of this invention is to minimize the amount of air admitted to the generator during the recharging operation. Broadly speaking, this is accomplished by allowing a return flow of acetylene into the generating chamber from the gas holder to replace the residuum being discharged and to maintain a gas supply within the generating chamber that will exclude air that might otherwise enter from the outside during the reduced pressure in the generating chamber. Furthermore, the charging hopper is provided at its inlet throat with improved means for inhibiting the entry of air into the apparatus when carbide is recharged into the generator hopper, and the residuum outlet is liquid sealed to exclude air at that point during the discharge of residuum. The apparatus is desirably designed so that a gas volume is maintained in the holder sufficient to replace the residuum withdrawn from the generator being recharged and also sufficient to feed the service main during the recharging operation. A single generator may be used for this purpose, provided the holder is of sufficient capacity to supply gas to replace the residuum withdrawn while the generator is being recharged and at the same time continuously feed gas to the service main at a uniform pressure, but in many instances the demands of the service main are so great that a very large holder would be required for this purpose. Therefore, I provide an improved duplex generating apparatus in which the arrangement is such that at least one generator is always in operation generating gas and supplying it to the holder. In such duplex apparatus, a smaller capacity holder usually suffices to return gas to the generator being recharged and to continuously supply gas to the service line during the recharging operation.

The objects and novel features of the invention will be apparent from the following description taken with the drawing, which is a diagrammatic section of an acetylene generating apparatus which embodies this invention. Although the drawing discloses a very desirable type of generating apparatus that comprises two similar acetylene generators G, G' connected to a single gas holder H, it will be understood that features of this invention are applicable to generating apparatus comprising a single generator and holder, as already indicated. Gas from the holder is adapted to be continuously delivered to a service main M for supply oxy-acetylene welding and cutting equipment, or for other purposes.

Since the generators G, G' are alike in all essential respects, only the generator G will be described somewhat in detail. As shown, this generator comprises a shell carrying a carbide hopper C adapted to supply carbide to the generating chamber D, the lower part of which is filled with water through the usual filling pipe 10 to the level determined by the usual liquid sealed overflow pipe 11. A residuum outlet pipe 12 is connected to the filling pipe 10 above the point where the latter opens into the generator, so as to provide a liquid seal and prevent entry of air into the generator when residuum is withdrawn during recharging, the pipe 10 having a filling funnel 101 at its upper end. Carbide may be fed to the generating chamber by any suitable means, such as a rotatable disk 13 below the spout of the hopper C. The disk is carried by a spindle which may be rotated by a weight-driven motor T that is controlled by levers 14 and 15, connected by chains 141 and 151 to the bell H', whereby the generation of acetylene in each generator is controlled by the fall and rise of the bell of the common holder. When the carbide supply of a generator is exhausted and while it is being recharged, its chains are temporarily unhooked from the bell, as shown. A cone 131 in the hopper directly above the hopper outlet and feed disk takes the load of the main body of carbide off of the disk.

Calcium carbide may be charged into the hopper C through a door 16 that opens the hopper directly to the atmosphere. In prior generators, the volume of air sucked into the hopper and generator with the carbide during charging often about equals the total volume of the charge of carbide. To avoid such air injection, the present invention provides improved means at the carbide inlet of the hopper to retard the entry of such air, which would otherwise seriously contaminate the acetylene in the generator. As shown, a baffle trap A is provided to retard the flow of carbide as it is poured into the hopper, thereby eliminating the suction of air into the generating chamber. The trap A may consist of a tubular throat 17 just within the door 16 and opening into the upper end of the carbide hopper proper. The throat 17 desirably contains a number of spaced downwardly inclined baffles 18 alternately projecting from opposite walls of the throat and vertically overlapped so as to provide a zig-zag inlet passage adapted to retard the flow of carbide into the hopper proper, thereby effectively inhibiting the entry of air with the carbide. The acetylene pressure in the generator and empty hopper also tends to exclude air, as will presently appear.

During normal operation of the generator, the acetylene generated in the chamber D is delivered to the holder through a passage that is liquid-sealed against return flow from the holder. As shown, such passage comprises a pipe 20 that opens at 201 into the generating chamber D above the water level therein and terminates in a slotted flaring end 21 that is liquid sealed by the water 22 in the chamber 23 below the gas bell tank 24. When the pressure of the generated acetylene in the chamber D and pipe 20 exceeds the gas pressure in the chamber 23 plus the equivalent pressure of the liquid seal 22, such seal breaks, allowing the generated gas to flow through the slots 211 into the chamber 23 and through the pipe 26 into the bell H', which is liquid-sealed in the tank 24 in the usual manner. For example, assuming that the acetylene pressure maintained in the bell is equivalent to 17½ inches of water and the water seal in the chamber 23 is a little less than one inch, then the acetylene pressure in the generating chamber must be equivalent to about 18½ inches of water before acetylene will flow into the holder from the generator.

When the carbide supply in a hopper is exhausted, the generator is usually recharged by discharging the residuum and refilling the generator with clean water, as well as a charge of carbide. By opening the residuum gate R, residuum is discharged from the generator through the pipe 12, but a small quantity remains in the generator to provide a liquid seal for the outlet pipe 12. To more effectively remove the residuum, the generator may be flushed several times by alternately running in fresh water through the filling funnel 101 and drawing off residuum from the gate R. The agitator K, having an outside operating handle, is desirably rotated just before discharging residuum and also when flushing with fresh water. The bottom 28 of the generator may be inclined toward the outlet 102 to minimize the quantity of residuum left in the generator and a plug 103 may be provided so that the generator may be purged of residuum when desired.

While recharging a particular generator, acetylene generation therein ceases, and as the residuum is drawn off the pressure in the generator diminishes to a vacuum. In order to avoid introduction of air into the generator due to this vacuum, acetylene from the gas bell H' is returned to the generating chamber to replace the volume of residuum being drawn off. Such acetylene may not, in the present instance, be returned through the liquid seal 22, and desirably is returned to the generating chamber at a point above the normal water level therein, and conveniently through the opening 201 and part of the pipe 20 leading to this opening. In order that such return flow of acetylene may be automatically effected, a balance seal is provided between the gas holder H and the generating chamber D, which may be in the form of a liquid seal chamber or pot P that is desirably independent of the holder and generator. As shown, the balance seal pot P contains a body of liquid 30 that may be supplied and replenished through the filling opening 31 of an inlet pipe 32 that discharges close to the bottom of the pot. The pot has a cover to seal it from the atmosphere and a chamber 33 therein is in communication with and constantly subject to the pressure of the generating chamber, as through a pipe 34 that opens into the pipe 20. A gas inlet pipe 35, that communicates with the gas holder H by connection to the supply main M, has its outlet at a substantial distance below the liquid level in the pot P, so as to normally prevent the flow of acetylene in either direction through the balance seal pot. The pressure equivalent of the liquid seal of the pipe 35 in the seal pot is slightly greater than the gas pressure in the gas holder, which latter pressure is less than that in the generating chamber and chamber 33 during the normal operation of the generator. When the generator is being recharged and residuum is withdrawn therefrom, a reduced pressure or a slight vacuum is created in the chamber 33. This produces a pressure differential between pipe 35 and chamber 33 which is soon sufficient to break the seal of the liquid 30 and acetylene from the holder H is then delivered to the chamber 33, and through the pipes 34, 20 and opening 201 to the generating chamber D, as indicated by the arrows applied to the pipes 35, 34 and 20, and the seal pot P. For example, assuming that the pressure in the bell H' is equivalent to about 17½ inches of water, and the inlet pipe 35 is water sealed about two inches more than the gas bell pressure, then, as soon as the vacuum in the generating chamber reaches about two inches of water, the water seal in the balance seal pot will break and acetylene from the gas bell will pass over and replace the volume of residuum being discharged from the generating chamber that is being recharged. This replacement acetylene is not lost but is later returned through the opening 201, pipe 20, chamber 23 and pipe 26 to the gas bell for further use. This replacement acetylene also fills the empty hopper and creates a pressure therein that tends to prevent entry of air when the door 17 is opened. After the generator is recharged with water and carbide, it is ready to generate acetylene as soon as the motor T and its controls are reset, and when generation starts the balance seal automatically restores to prevent return flow of acetylene.

When only a single generator is employed, the capacity of the holder H should be such that it will be capable of maintaining a constant supply of gas at uniform pressure to the main M for the continuous operation of gas consuming appliances connected thereto, and at the same time supply residuum-replacement acetylene to the generator, when the latter is to be recharged. However, the demands of the gas consuming devices are often so great that an impractically large holder would be required to fulfill both of the above requirements while the generator is idle. Therefore, according to this invention, a smaller holder may be employed and a plurality of generators, two in the present apparatus, are employed to generate and deliver gas to the holder. As shown, the generators are desirably arranged to operate alternately,—at any rate, one generator is generating and delivering acetylene to the holder while the other is being recharged and while the holder is returning acetylene to the idle generator and at the same time continuously delivering acetylene to the service main M. The generators may be of different sizes, but for practical advantages, such as identity of supplies, repair parts, etc., they are desirably of the same size and type. Each generator operates independently of the other but the acetylene generation in both are controlled by the same gas bell. As shown, the generator G' is in operation, generating and delivering acetylene through the pipe 20', slots 211', seal 22', chamber 23' and pipe 26' to the bell H', as indicated by the arrows in these passages. Meantime, the generator G is idle and being recharged, the vacuum therein causing the water 22 to rise in the pipe 20 and also automatically causing a return flow of acetylene from the holder through the balance seal pot to the generator, while the holder is also delivering acetylene through the pipe M' to the service main M. This duplex generating apparatus therefore provides a continuous supply of acetylene to take care of varying demands and does not require a large holder. Moreover, since air is practically excluded from the apparatus, a continuous uniform supply of substantially pure acetylene will be delivered to the service main and appliances connected thereto.

In recharging the types of acetylene generators heretofore generally used, air is usually admitted through a suitable vent pipe into the generating chamber, when drawing off residuum. Such generators must be purged every time they are recharged, by driving out such air into the atmosphere, which results in the loss of considerable acetylene that goes out with the air. Since, according to this invention, acetylene from the holder is used instead of air, such loss is entirely eliminated because all of this acetylene is eventually returned to the holder and utilized. Moreover, a very important additional advantage is here obtained,—namely, the element of hazard is reduced to a minimum by keeping practically pure acetylene in the generating chamber at all times, the percentage of air therein being so small that the gas will not ignite.

It will be understood that the usual vents, filter, back pressure valve, safety devices and other accessories may be applied to the generators and holder shown, and that various changes may be made in the apparatus as disclosed without departing from the spirit of this invention or sacrificing any of its advantages.

I claim:

1. In an acetylene generator, the combination with a carbide hopper having a charging inlet opening to the atmosphere during charging, of means forming a zig-zag carbide inlet passage adapted to inhibit entry of air with the carbide when charging the latter into said hopper.

2. In an ecetylene generator, the combination with a carbide hopper having an inlet throat, a door normally closing said throat but adapted to open the same directly to the atmosphere when carbide is charged into said hopper, and a number of baffles in said throat oppositely inclined and arranged to provide a zig-zag inlet passage adapted to inhibit entry of air into said hopper when carbide is charged into said hopper through said throat.

3. In gas generating apparatus, the combination with a gas holder, of a gas generator communicating with said holder and arranged to supply gas thereto during normal operation of said generator and arranged to receive gas from said holder to replace residuum withdrawn from said generator when recharging the latter, said generator comprising a hopper having a charging inlet adapted to open to the atmosphere during such recharging and means adjacent such inlet at the entrance of said hopper inhibiting the entry of air into said hopper and generator with the material charged through said inlet into said hopper.

4. In acetylene generating apparatus, the combination with a gas holder, of an acetylene generator, means for conducting acetylene from said generator to said holder during normal operation but sealed against return flow of acetylene from said holder and means whereby acetylene from said holder is admitted to said generator to replace a volume of residuum discharged from the generator when recharging the same, said generator having an air-excluding residuum outlet and a carbide hopper provided with means adjacent its charging inlet adapted to inhibit entry of air into said generator in charging carbide through said inlet into said hopper, whereby the acetylene in the apparatus is substantially uncontaminated by air when recharging.

5. In acetylene generating apparatus, the combination of a gas generator, a service main, a gas holder for receiving acetylene from said generator and delivering acetylene to said main, and means including a conduit having a liquid seal between said generator and said holder operative to return acetylene from said holder through said seal to said generator during recharging without necessarily interrupting the delivery of acetylene to said main.

6. In acetylene generating apparatus, the combination of an acetylene generator having means arranged to substantially exclude air therefrom when it is being recharged with carbide and water and comprising a liquid-sealed residuum outlet, a gas holder, and conduit means whereby acetylene is delivered from said generator to said holder during normal operation of said generator, and means whereby acetylene is automatically delivered from said holder through part of said conduit means to said generator to replace a volume of residuum discharged from said outlet when recharging said generator.

7. In acetylene generating apparatus, the combination of an acetylene generator adapted to contain carbide, water, and acetylene, a gas holder, and means comprising a combined gas inlet and outlet means above the normal water level in said generator whereby acetylene is delivered from said generator to said holder during normal operation of said generator, and liquid-sealed means through which acetylene is automatically delivered from said holder through said combined means to said generator to replace a volume of residuum discharged from said generator when the same is recharged.

8. In acetylene generating apparatus, the combination of an acetylene generator; a gas holder; means whereby acetylene may be delivered to said holder from said generator during the normal operation of the latter; and means, comprising a balance seal chamber normally subject to the gas pressure in the generator, operative to allow a return flow of acetylene from said holder to said generator to replace a volume of residuum discharged from said generator when recharging the same.

9. In acetylene generating apparatus, the combination of an acetylene generator; a gas holder; liquid sealed means whereby acetylene may be delivered to said holder from said generator during the normal operation of the latter; a liquid seal pot constantly subject to the gas pressure in the generating chamber of said generator; and a passage communicating with said holder and normally sealed by the liquid in said pot but rendered operative to permit a return flow of acetylene from said holder to said generator when residuum is discharged from said generator.

10. In acetylene generating apparatus, the combination of an acetylene generator; a gas holder; a pipe communicating with said generator above the normal water level therein; liquid-sealed means whereby acetylene is delivered to said holder from said pipe during the normal operation of said generator; and means comprising a liquid seal chamber communicating with said holder and said pipe and operative to allow a return flow of acetylene through said pipe to said generator to replace a volume of residuum discharged from said generator when recharging the latter.

11. Gas generating apparatus comprising the combination with a plurality of gas generators, of a gas holder adapted to receive gas from said generators, and means whereby gas from said holder is returned to said generators.

12. In acetylene generating apparatus, the combination of a gas holder, acetylene generators, means comprising independent liquid seals whereby acetylene may be delivered from said generators to said holder, and automatically operative means whereby acetylene may return to said generators from said holder.

13. In acetylene generating apparatus, the combination of a gas holder, acetylene generators having means at the carbide inlets thereof adapted to inhibit the entry of air, means operatively associated with said holder for controlling the generation of acetylene in said generators, liquid-sealed means whereby acetylene may be delivered from said generators to said holder but not in the reverse direction, and other liquid-sealed means automatically operative to allow a return flow of acetylene from said holder to said generators during the recharging of the latter.

In testimony whereof, I affix my signature.

ROBERT J. KEHL.